Figure 1:
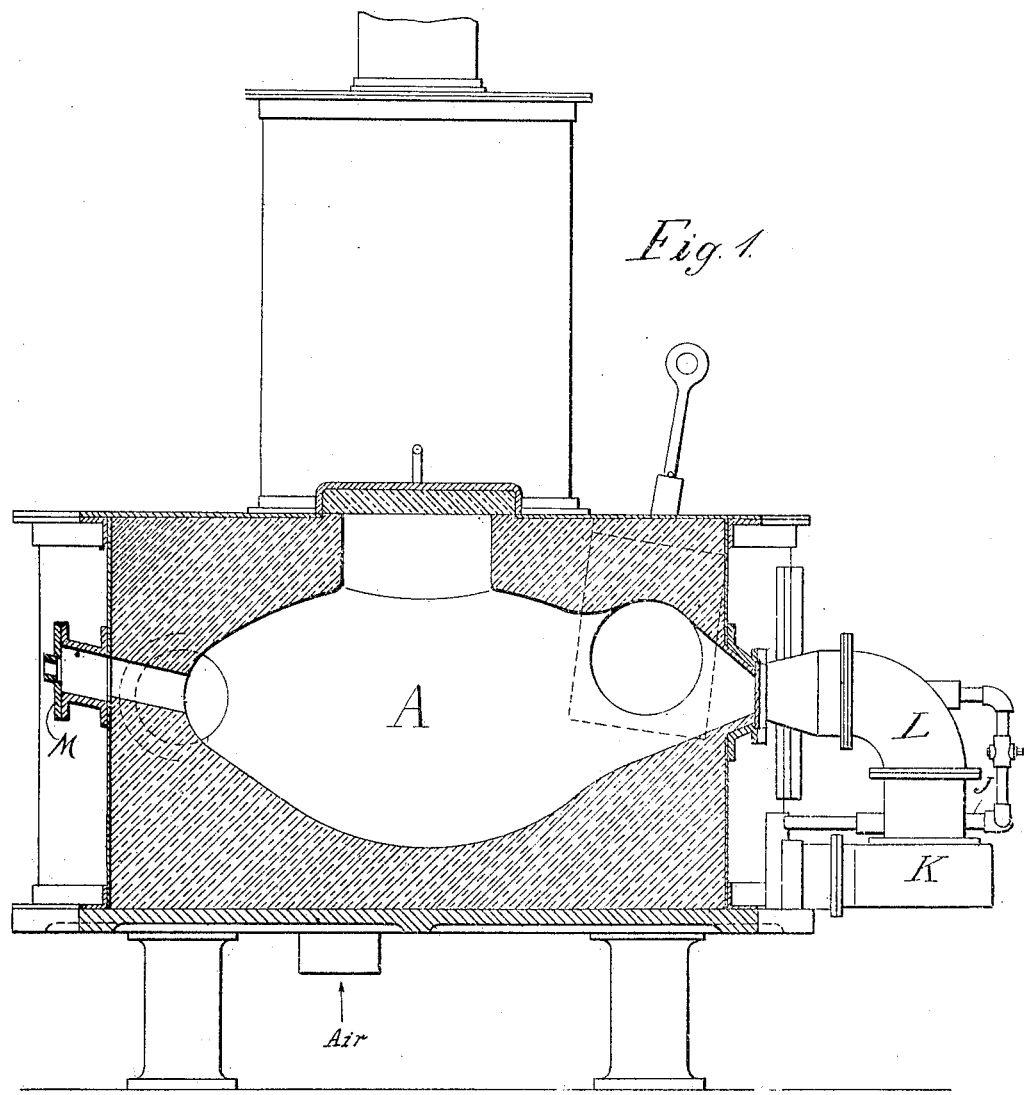

No. 876,275. PATENTED JAN. 7, 1908.
A. KOCH.
SMELTING FURNACE WITH OIL FIRE.
APPLICATION FILED JUNE 27, 1906.

4 SHEETS—SHEET 1.

Witnesses:

August Koch
Inventor

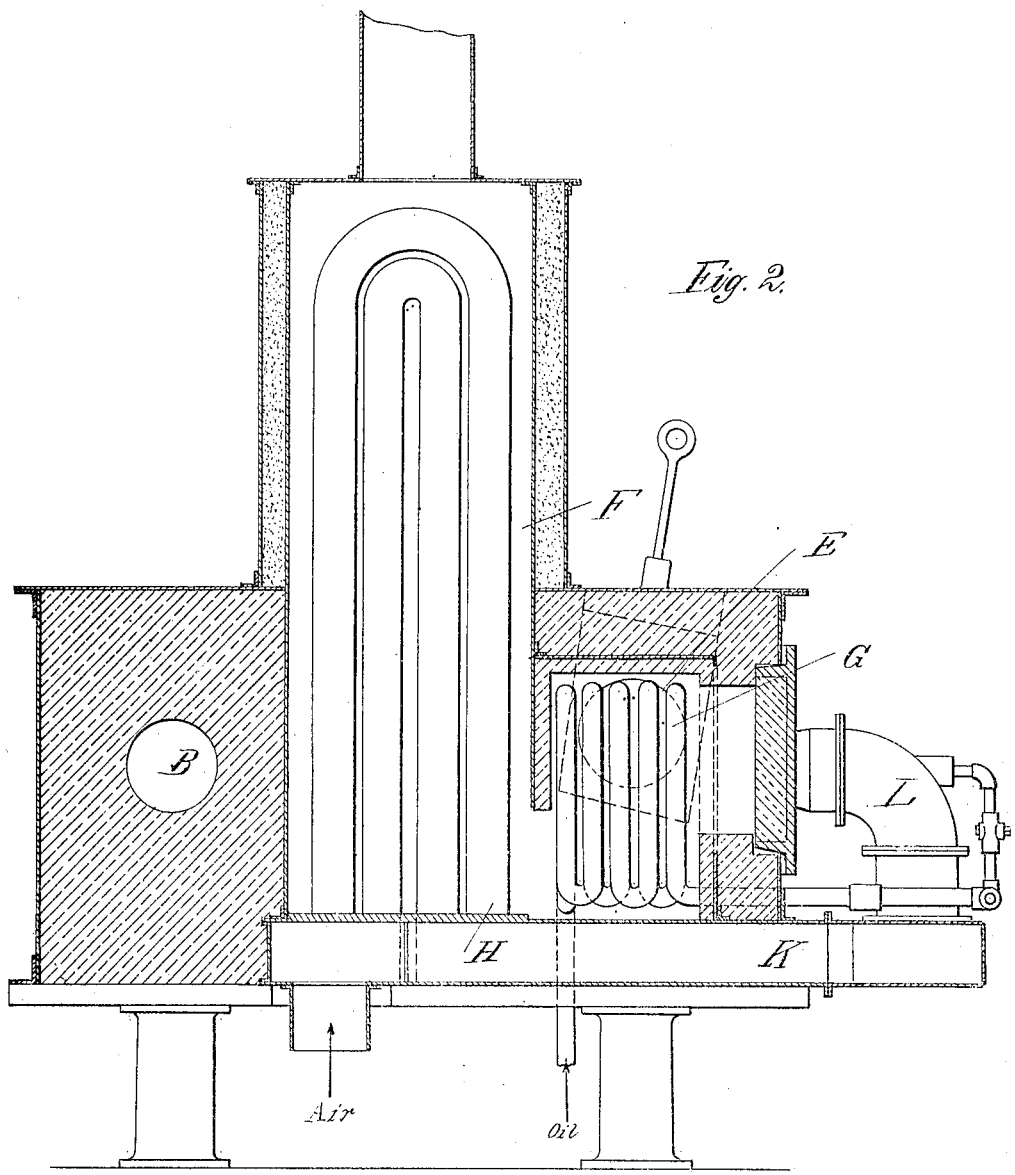

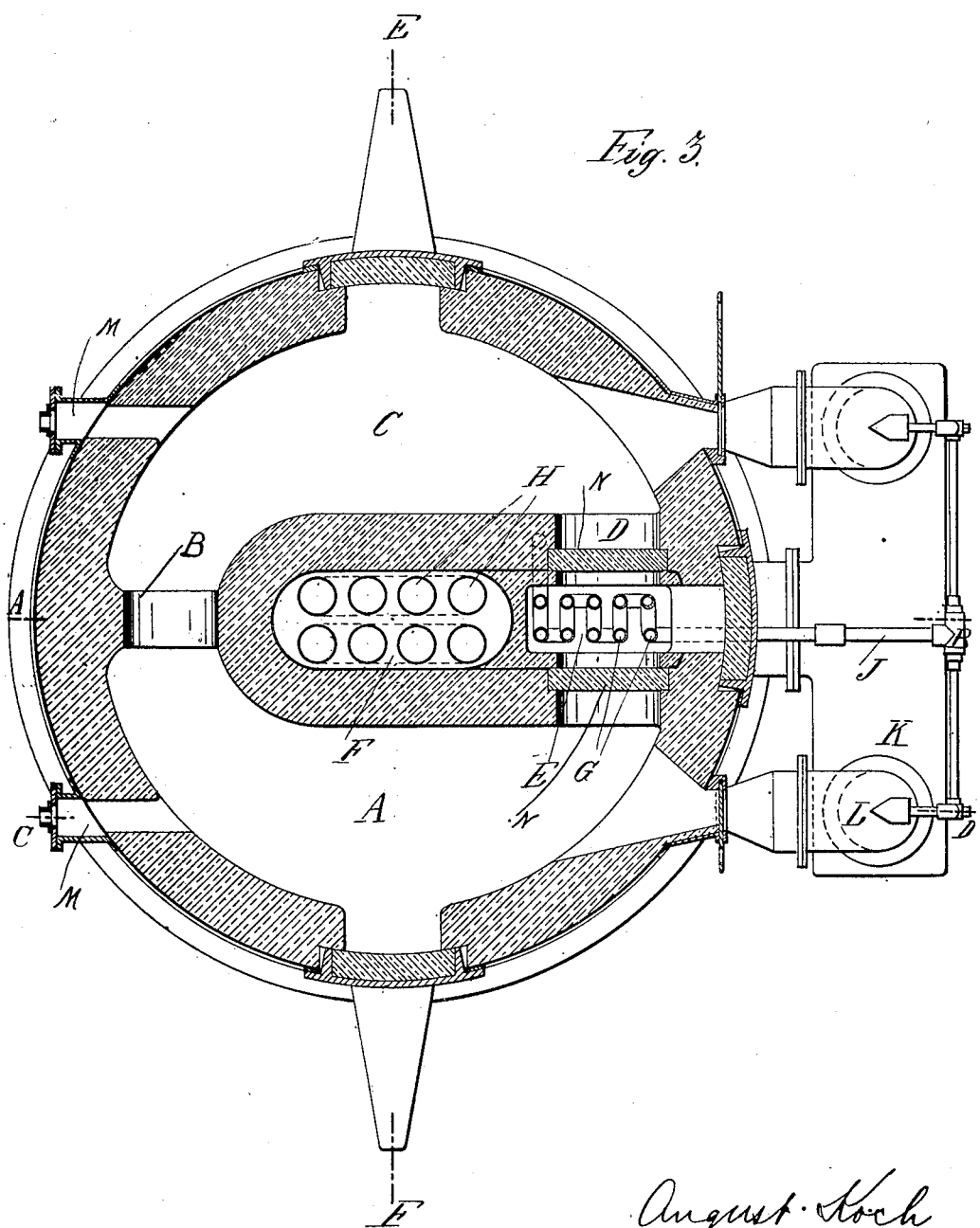

No. 876,275. PATENTED JAN. 7, 1908.
A. KOCH.
SMELTING FURNACE WITH OIL FIRE.
APPLICATION FILED JUNE 27, 1906.
4 SHEETS—SHEET 4.
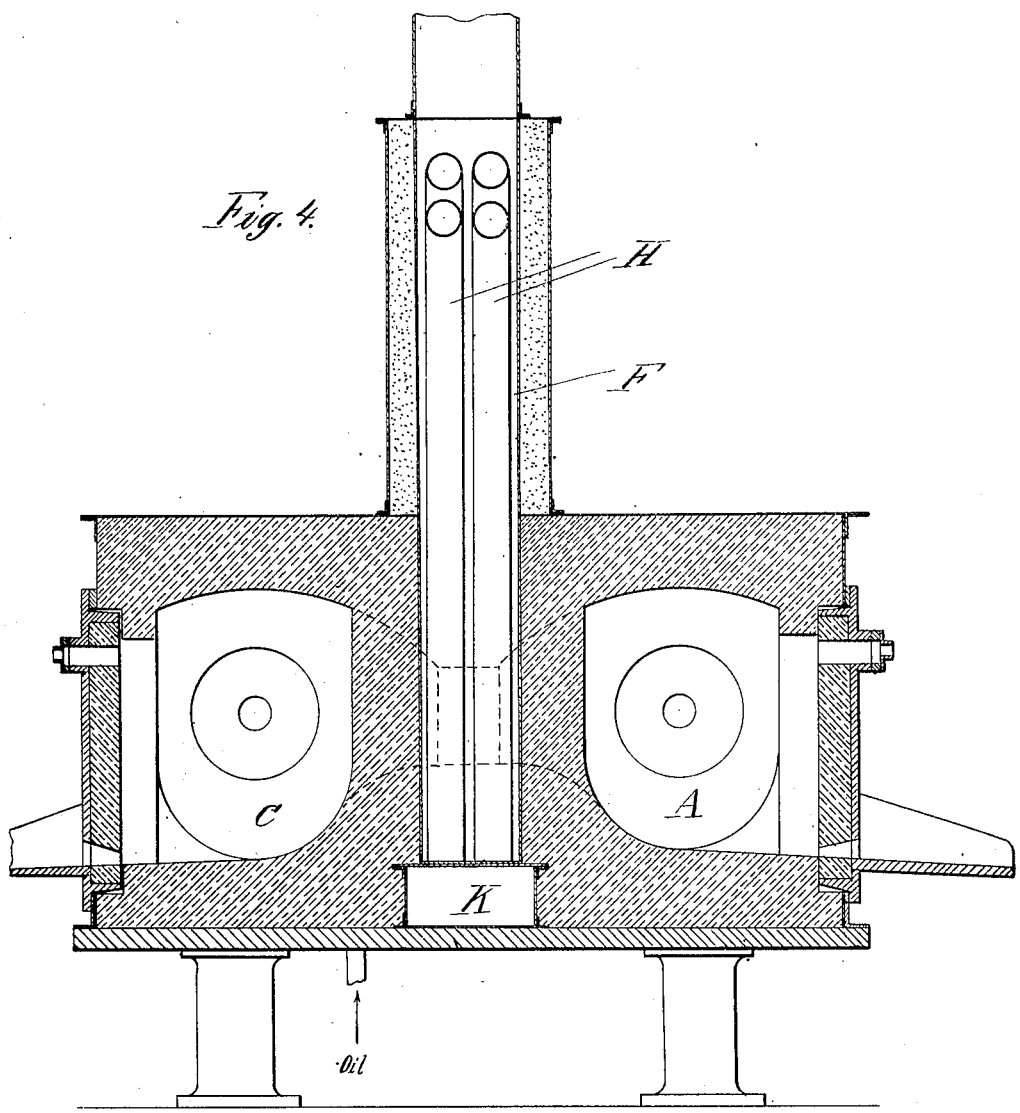

UNITED STATES PATENT OFFICE.

AUGUST KOCH, OF HANOVER-LIST, GERMANY.

SMELTING-FURNACE WITH OIL FIRE.

No. 876,275.

Specification of Letters Patent.

Patented Jan. 7, 1908.

Application filed June 27, 1906. Serial No. 323 661.

*To all whom it may concern:*

Be it known that I, AUGUST KOCH, mechanician, a subject of the Emperor of Germany, residing at Hanover-List, in the Empire of Germany, have invented certain new and useful Improvements in a Smelting-Furnace with Oil Fire, of which the following is a specification.

The present invention relates to furnaces for melting metals, such as iron, steel, etc., in which in the customary manner the gaseous products of the melting process in passing off preliminarily heat the charge for the subsequent melting in two or more communicating chambers. The conducted and radiated heat, generated during the melting process is used for vaporizing the liquid fuel as well as for heating the air necessary for the combustion, so that in spite of the drop in temperature caused by heating a charge to be subsequently melted, the fuel is vaporized and the air heated to a high temperature. By this means it is possible to successfully use the heaviest oils and oil residues for melting metals. As the heat of the air and the vaporized fuel is very intense, the highest temperature may be generated solely by means of the heat of the refuse gases and the heat radiated by the melting chambers and the walls thereof. The air necessary for the combustion is led into the preliminary heating chamber so that it passes along the wall of the melting chamber thereby cooling the latter and prolonging the usefulness of the furnace.

In the present invention, the chambers which contain the air heating and vaporizing tubes are located within the furnace between the melting chambers so that they are exposed to the heat of the refuse gases resulting from each melting, as well as to the heat radiated by the melting chambers and their walls.

The air and vaporizing chambers are connected with the adjoining melting and heating chambers so as to permit the hot refuse gases to first pass through the oil vaporizing chamber and then through the air heating chamber. The melting chambers are used alternately so that while the melting process is underway in one chamber, the other chamber is up ed with metal to be melted. The al he latter is preliminarily heated by the gases which enter the same from the chamber in which the melting is in progress. The gases entering the preliminary heating chamber are so intensely heated that in the case of a metal of a low melting point, the melting is accomplished without necessitating any additional heating of this chamber.

The invention will now be described with reference to the accompanying drawings and the distinctive features thereof more particularly set forth in the annexed claims.

Figure 1 is a vertical section through one of the melting chambers. Fig. 2 is a vertical section through the oil vaporizing and air feeding chambers. Fig. 3 is a horizontal section and Fig. 4 is a sectional elevation showing the melting chambers and the relation of the air and fuel chambers thereto.

The furnace may be constructed of any suitable material in the usual form and is provided with two melting chambers A, C which are connected by a passage B and provided with the ordinary form of peep-hole openings M through which the melting process may be conveniently observed.

Located between the chambers A, C, are an oil vaporizing chamber E and an air heating chamber F. The chamber E is provided with a plurality of heating coils G through which the oil continuously circulates.

H are tubes in the chamber F which serve to break the volume of air entering the chamber into thin layers to facilitate the heating process.

J and K are pipes communicating with the oil vaporizing and air heating chambers respectively. L, L are mixing pipes into which the vapor and heated air are discharged from the pipes J and K and combine.

D is a passage communicating with the melting chambers and the vaporizing and air heating chambers which is provided with fire proof gates N operating in suitable guide ways. During the operation of the furnace the gate which communicates with the passage leading to the chamber, which is being used for melting, is closed, while that leading to the preheating chamber remains open. By this arrangement the waste gases are forced to pass through the preheater from which they enter the oil vaporizing chamber.

Assuming that the melting process is in progress in chamber A, the hot gases arising therein pass through the passageway B into the chamber C, which has been charged with metal, and preliminarily heat the metal contained therein. From the chamber C the gases pass through the passage D into the oil vaporizing and air heating chambers, and the hot gases combined with the heat radiated from the furnace itself cause the oil to vaporize and heat the air. The vapor and air thus prepared are led through the pipes J and K into the common pipe L where they are mixed and led into the melting chamber.

Having thus described my invention, what I claim as new therein and desire to secure by Letters Patent is:

1. In a furnace of the character described, the combination of a plurality of chambers adapted to be alternately used for melting and preheating, oil vaporizing and air heating chambers located between said melting chambers, so that the heat radiated by the melting chambers will vaporize the oil and preheat the air in said air and oil chambers.

2. In a furnace of the character described, the combination of two melting chambers adapted to be alternately used as melting and preliminary heating chambers, of means for carrying the heated gases from the melting chamber to the preliminary heating chamber, an oil vaporizing chamber and an air heating chamber located between said melting chambers and means for heating the air and oil in said air heating and vaporizing chambers by the refuse gases and the heat generated in the melting chamber during the melting process.

3. In a furnace of the character described, the combination of two melting chambers adapted to be alternately used as melting and preliminary heating chambers, an oil vaporizing chamber an air heating chamber located between said melting chambers and means for utilizing the refuse gases and heat generated during the melting for heating the air and oil in said air and oil heating chambers.

In testimony whereof I affix my signature in the presence of two witnesses.

AUG. KOCH.

Witnesses:
HENRY J. FULLER,
HERMINE GÖDECKE.